Patented Jan. 23, 1934

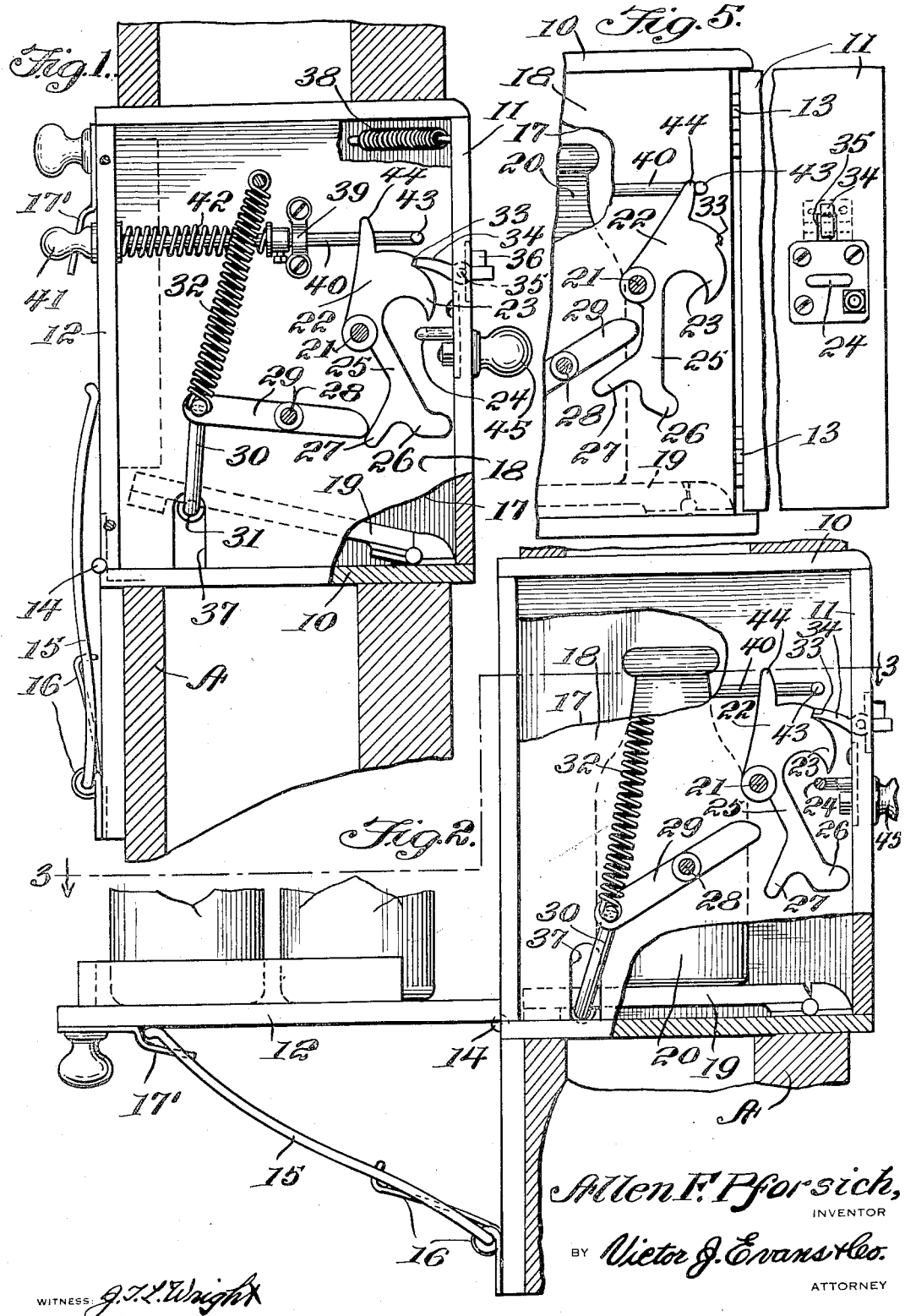

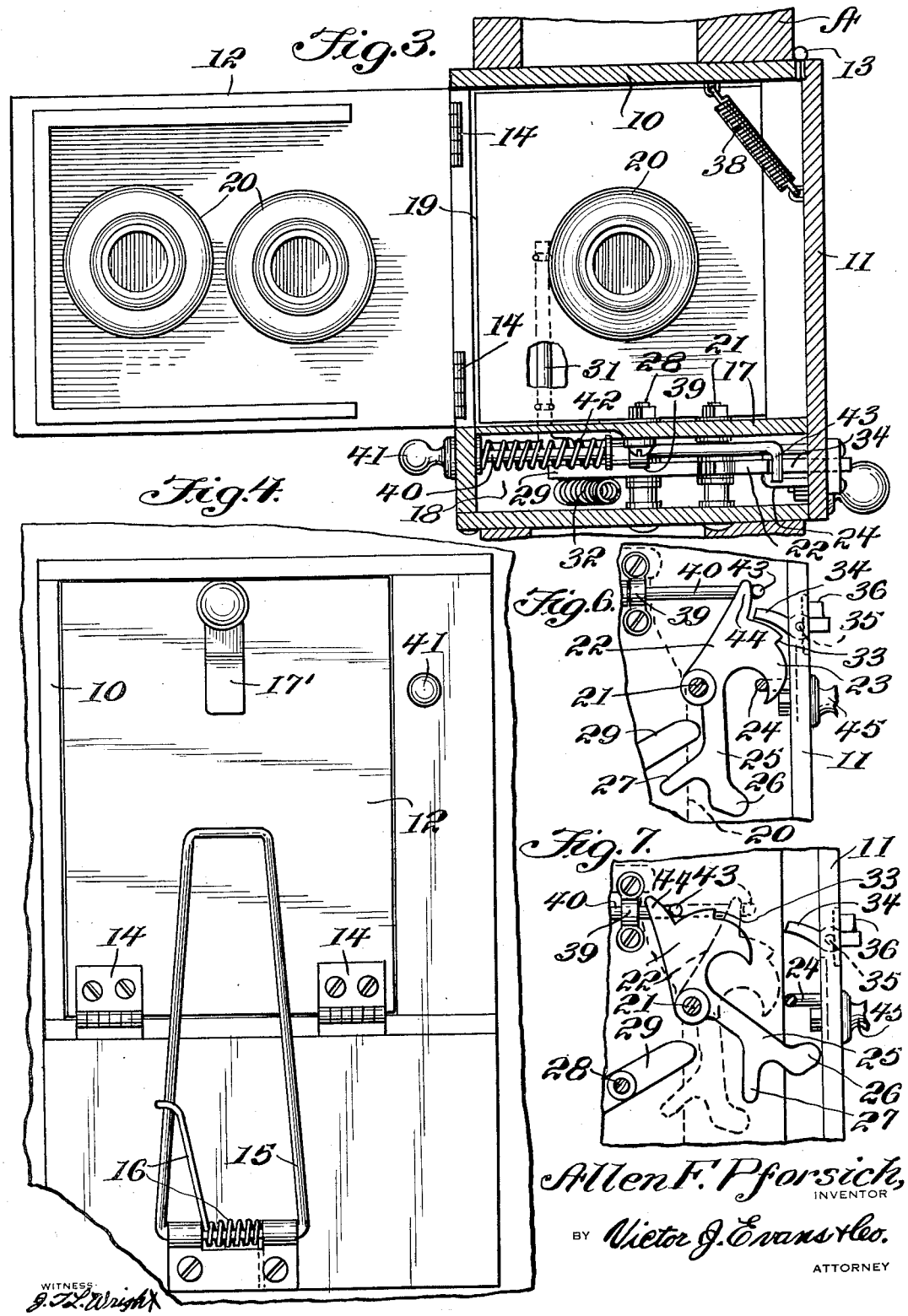

1,944,806

UNITED STATES PATENT OFFICE 1,944,806

BOTTLE OR CONTAINER RECEIVER

Allen F. Pforsich, Glassport, Pa., assignor of one-half to Barney J. Morrow, Glassport, Pa.

Application February 21, 1933. Serial No. 657,901

5 Claims. (Cl. 232—41)

The invention relates to a bottle or container receiver and more especially to an automatically locked and secured receptacle for milk bottles and containers.

The primary object of the invention is the provision of a receptacle of this character, wherein access is had both outside and inside of an enclosure so that milk bottles or containers or the like can be conveniently placed therein, either empty or filled, and the receptacle automatically locked after the placing of such bottle, container or the like therein, thereby preventing possible theft of such bottle, container or the like, or the contamination of its contents.

Another object of the invention is the provision of a receptacle of this character, wherein the locking mechanism is of novel construction and in its use, safety is assured to prevent the removal of a filled bottle, container or the like therefrom after having been placed therein from the outside of an enclosure and such mechanism is automatic in its operation yet susceptible of manual operation only by a person within the enclosure, thus rendering the receptacle theft-proof.

A still further object of the invention is the provision of a receptacle of this character which is simple in construction, thoroughly reliable and efficient in its purposes, strong, durable, and inexpensive to manufacture and install.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:

Figure 1 is a fragmentary vertical sectional view through the wall of a building showing the receptacle constructed in accordance with the invention mounted therein with the parts in normal position.

Figure 2 is a view similar to Figure 1 showing the inside door open.

Figure 3 is a sectional view on the line 3—3 of Figure 2 looking in the direction of the arrows.

Figure 4 is a view in elevation looking toward the inner side of the receptacle.

Figure 5 is a view similar to Figure 1 showing the outside door open and a bottle within the receptacle.

Figure 6 is a fragmentary view similar to Figure 5 showing the outside door latched or locked and a bottle within the receptacle.

Figure 7 is a view similar to Figure 6 showing by dotted lines the position of the locking dog and by full line positions the shifting thereof by the manually operating means of the locking mechanism, the outside door being kicked partly open by the locking dog.

Similar reference characters indicate corresponding parts throughout the several views in the drawings.

Referring to the drawings in detail, A designates generally a portion of the vertical wall of a building into which is built the receptacle constituting the present invention. This receptacle comprises a box-like body 10 having a horizontally swinging outside door 11 and a vertically swinging inside door 12, respectively. These doors are supported by hinges 13 and 14 respectively, of any standard type. It will be apparent that by the opening of the outside door 11, access may be had to the interior of the body 10 and this is true with respect to the opening of the inside door 12.

Swingingly supported in any suitable manner at the inner face of the wall A below the axis of movement of the door 12 is a propping bail 15, tensioned by a spring 16 of any suitable kind, the spring being normally tensioned against the door 12 to maintain the same closed. On the opening of the door 12 and the swinging thereof to a horizontal plane the bail 15 moves outwardly against the door to engage in a keeper 17' so that when the door is subjected to weight it will be propped by the bail 15 to support its load. When the load has been relieved from the door 12 the bail 15, under the tension of the spring 16, automatically closes the same.

Arranged at one side of the body 10 interiorly thereof is a partition 17, the same being parallel with the adjacent side of the body 10 and forming a chamber 18 for accommodating the locking mechanism hereinafter fully described.

Hinged forwardly within the body 10 is a platform 19 upon which is adapted to be placed the bottle 20 or the like, either when filled or empty, and the weight of this bottle will lower the platform 19 onto the bottom of the body 10 as is obvious from Figures 2 and 5 of the drawings for the purpose presently described.

Arranged in the chamber 18 is a horizontal pivot 21 upon which is supported a swinging locking dog 22, the bill 23 of which is engageable in an eye keeper 24 mounted on and projected inwardly from the inner face of the outside door 11. The dog 22 is formed with an extension arm 25 depending therefrom forwardly of its axis or pivot 21, the arm being formed with a kicking toe 26 and an angular heel 27 respectively. Arranged rearwardly with respect to the pivot 21 is a horizontal pivot 28 on which is swingingly supported a rocking trip lever 29, the heel end of which loosely engages a stirrup 30, the horizontal portion 31 of which is pivotally connected to the underside of the platform 19 and this stirrup has engaged therewith at its connection with the lever 29 a coiled retractile spring 32 which is hung elevated with respect to the lever 29 within the chamber 18.

The dog 22 inwardly with relation to its bill 23 is provided with a shoulder 33 with which engages a pawl 34 pivoted at 35 within the outside door 11, the swinging movement of the pawl 34 in one direction being limited by a stop 36 arranged in the path of movement of said pawl 34. The pawl 34 when engaging the shoulder 33 prevents the bill 23 of the dog 22 engaging in the keeper 24 as will be apparent from Figures 1 and 2 of the drawings when the outside door 11 is closed and the platform 19 is devoid of weight thereon or when in its normal raised or elevated position. When the outside door 11 is opened and a bottle is placed upon the platform 19 the latter, when being lowered, operates on the lever 29 so that the latter will rock and thus the dog 22 will swing to a position whereby the pawl 34 will escape the shoulder 33 upon the closing of said outside door 11 and this dog 22 will then lock with the keeper 24. Upon opening of the inside door 12 the bottle 20 placed within the receptacle from the outside can be removed, whereupon the platform 19 rises, operating the lever 29 which acts against the heel 27 of the dog 22, retracting it so that the bill 23 will be released from the keeper 24 and thus unlatching the outside door 11. The pawl 34 then engages the shoulder 33, maintaining the dog 22 in unlatched position with respect to the keeper 24 on the outside door 11.

The partition 17 is provided with a slot 37 forming a clearance for the stirrup 30. Connected with the outside door 11 and to the body 10 is a coiled tensioning spring 38 which serves to pull the door 11 to closing position on the opening thereof.

Slidably fitted in the chamber 18 in a suitable guide 39 is a hand operated releasing rod 40 having the hand knob 41 outside of the body 10 and tensioned by the spring 42, the rod 40 being formed with a tripping hook 43 arranged in the path of a horn 44 on the dog 22. Thus on manual pulling outwardly upon the knob 41 the rod 40 will be drawn outwardly of the chamber 18 and its hook 43 in the path of the horn 44 will engage the same and thereby operate such dog to have its toe 26 kick open the outside door 11 under the tension of the spring 38 and this spring, under its tension, causes the door to act against the toe 26 of the dog 22 to keep it from latching with the keeper 24. Thus when a person places an empty milk bottle 20 within the receptacle, the service man from the outside can remove the said empty milk bottle and replace it with a filled bottle before the outside door 11 will become locked.

It should be obvious that when an empty milk bottle is placed within the receptacle from the inside of the enclosure, on the opening of the inside door 12 such empty milk bottle can be removed by the service man from without the enclosure and a filled milk bottle replaced within the receptacle, whereupon the outside door 11 automatically locks against opening movement.

The outside door 11 has fitted therewith a hand knob 45 for the convenience of the outside service man in the opening of the outside door against the resistance of the spring 38 acting upon said door.

The spring 42 normally maintains the rod 40 inwardly of the chamber 18 in the receptacle and this rod 40 is manually manipulated by the rod 41 as should be apparent.

What is claimed is:

1. A container receiver comprising a box-like body for mounting in a vertical wall of a building and having outside and inside swinging doors, a container platform hinged for vertical swinging movement within the lower portion of said body, the outside door being horizontally swung and the inside door being vertically swung, a keeper at the inner face of the outside door, a pivoted gravity acting dog mounted within the body and engageable with the keeper, a kicking toe on said dog and engageable by the outside door, an angular heel extended from the toe, a rocking trip lever pivoted in said body and operating in the path of the heel, a stirrup connected with the platform and with the rocking trip lever, and tensioning means operative upon the trip lever to engage the same with the heel when the platform is free of a container, whereby the dog will be released from the keeper.

2. A container receiver comprising a box-like body for mounting in a vertical wall of a building and having outside and inside swinging doors, a container platform hinged for vertical swinging movement within the lower portion of said body, the outside door being horizontally swung and the inside door being vertically swung, a keeper at the inner face of the outside door, a pivoted gravity acting dog mounted within the body and engageable with the keeper, a kicking toe on said dog and engageable by the outside door, an angular heel extended from the toe, a rocking trip lever pivoted in said body and operating in the path of the heel, a stirrup connected with the platform and with the rocking trip lever, tensioning means operative upon the trip lever to engage the same with the heel when the platform is free of a container, whereby the dog will be released from the keeper, a shoulder on the dog, and a pawl carried by the outside door and engageable with the shoulder when the container platform is relieved of the weight of a container and the outside door closed to sustain the dog unlatched from the keeper.

3. A container receiver comprising a box-like body for mounting in a vertical wall of a building and having outside and inside swinging doors, a container platform hinged for vertical swinging movement within the lower portion of said body, the outside door being horizontally swung and the inside door being vertically swung, a keeper at the inner face of the outside door, a pivoted gravity acting dog mounted within the body and engageable with the keeper, a kicking toe on said dog and engageable with the outside door, an angular heel extended from the toe, a rocking trip lever pivoted in said body and operating in the path of the heel, a stirrup connected with the platform and with the rocking trip lever, tensioning means operative upon the trip lever to engage the same with the heel when the platform is free of a container, whereby the dog will be released from the keeper, a shoulder on the dog, a pawl carried by the outside door and engageable with the shoulder when the container platform is relieved of the weight of a container and the outside door closed to sustain the dog unlatched from the keeper, a spring tensioning the outside door, and a hand operable means for tripping the dog to disengage the dog from the keeper and operable at the inner side with respect to the vertical wall, whereby the kicking toe will open the outside door.

4. A container receiver comprising a box-like body for mounting in a vertical wall of a building and having outside and inside swinging doors, a container platform hinged for vertical swinging movement within the lower portion of said body, the outside door being horizontally swung and the inside door being vertically swung, a keeper at the inner face of the outside door, a pivoted gravity acting dog mounted within the body and engageable with the keeper, a kicking toe on said dog and engageable with the outside door, an angular heel extended from the toe, a rocking trip lever pivoted in said body and operating in the path of the heel, a stirrup connected with the platform and with the rocking trip lever, tensioning means operative upon the trip lever to engage the same with the heel when the platform is free of a container, whereby the dog will be released from the keeper, a shoulder on the dog, a pawl carried by the outside door and engageable with the shoulder when the container platform is relieved of the weight of a container and the outside door closed to sustain the dog unlatched from the keeper, a spring tensioning the outside door, a hand operable means for tripping the dog to disengage the dog from the keeper and operable at the inner side with respect to the vertical wall, whereby the kicking toe will open the outside door, and a swinging prop arranged with relation to the inside door to hold the latter when swung to a horizontal plane for the holding of containers when the said inside door is subjected to their weight.

5. A container receiver comprising a box-like body for mounting in a vertical wall of a building and having outside and inside swinging doors, a container platform hinged for vertical swinging movement within the lower portion of said body, the outside door being horizontally swung and the inside door being vertically swung, a keeper at the inner face of the outside door, a pivoted gravity acting dog mounted within the body and engageable with the keeper, a kicking toe on said dog and engageable with the outside door, an angular heel extended from the toe, a rocking trip lever pivoted in said body and operating in the path of the heel, a stirrup connected with the platform and with the rocking trip lever, tensioning means operative upon the trip lever to engage the same with the heel when the platform is free of a container, whereby the dog will be released from the keeper, a shoulder on the dog, a pawl carried by the outside door and engageable with the shoulder when the container platform is relieved of the weight of a container and the outside door closed to sustain the dog unlatched from the keeper, a spring tensioning the outside door, a hand operable means for tripping the dog to disengage the dog from the keeper and operable at the inner side with respect to the vertical wall, whereby the kicking toe will open the outside door, a swinging prop arranged with relation to the inside door to hold the latter when swung to a horizontal plane for the holding of containers when the said inside door is subjected to their weight and automatically closing said inside door on removing the containers therefrom.

ALLEN F. PFORSICH.